US008783748B1

(12) United States Patent
Quinn

(10) Patent No.: US 8,783,748 B1
(45) Date of Patent: Jul. 22, 2014

(54) FISHING ROD RETAINER SYSTEMS

(71) Applicant: Shane Quinn, Lino Lakes, MN (US)

(72) Inventor: Shane Quinn, Lino Lakes, MN (US)

(*) Notice: Subject to any disclaimer, the term of this patent is extended or adjusted under 35 U.S.C. 154(b) by 0 days.

(21) Appl. No.: 13/761,493

(22) Filed: Feb. 7, 2013

Related U.S. Application Data

(60) Provisional application No. 61/596,855, filed on Feb. 9, 2012.

(51) Int. Cl.
*A01K 97/10* (2006.01)
*B65D 71/00* (2006.01)

(52) U.S. Cl.
USPC .......................... 294/159; 211/70.8; 224/922

(58) Field of Classification Search
USPC ................ 294/141, 142, 143, 146, 147, 159; 43/21.2, 26, 54.1; 206/443; 211/70.8, 211/70.2; 224/922
See application file for complete search history.

(56) References Cited

U.S. PATENT DOCUMENTS

| | | | |
|---|---|---|---|
| 2,791,255 A * | 5/1957 | Ogden | 294/143 |
| 3,987,574 A | 10/1976 | Pennino | |
| 4,154,274 A * | 5/1979 | Adamson | 206/315.2 |
| 4,311,262 A | 1/1982 | Morin | |
| 4,628,628 A * | 12/1986 | Burgin et al. | 43/26 |
| 4,753,446 A * | 6/1988 | Mills | 280/47.18 |
| 5,137,319 A * | 8/1992 | Sauder | 294/159 |
| 5,450,688 A * | 9/1995 | Hall | 43/26 |
| 5,803,519 A | 9/1998 | Daigle | |
| D456,974 S | 5/2002 | Hicks | |
| 6,658,786 B1 | 12/2003 | Williams | |
| D582,508 S * | 12/2008 | Alley | D22/147 |
| 7,937,883 B2 * | 5/2011 | Roemer et al. | 43/21.2 |
| 2003/0051388 A1 | 3/2003 | Barnes et al. | |
| 2006/0207161 A1 * | 9/2006 | Lynn | 43/21.2 |

* cited by examiner

*Primary Examiner* — Dean Kramer
(74) *Attorney, Agent, or Firm* — RG Patent Consulting LLC; Rachel Gilboy

(57) ABSTRACT

A fishing rod retainer system is a device for enabling a fisherman to conveniently carry and transport several fishing poles at once, without tangling the fishing lines, to a fishing location for use. The device also uniquely enables the fisherman to stably place the multi-fishing-rod holder assembly in a vertical position on the flat outside surface of the second end-cap pole retainer, onto a flat ground surface, with multiple fishing rods securely placed within the plurality of first pole receivers and second pole receivers. The first end-cap pole retainer and the second end-cap pole retainer have in line concentrically located apertures that are about 2 inches in diameter so that the multi-fishing-rod holder assembly is able to be slideably inserted onto a secure post for complete stability during usage.

2 Claims, 5 Drawing Sheets

US 8,783,748 B1

FISHING ROD RETAINER SYSTEMS

CROSS-REFERENCE TO RELATED APPLICATION

The present application is related to and claims priority from prior provisional application Ser. No. 61/596,855, filed Feb. 9, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of fishing equipment, and more specifically relates to a fishing rod retainer system.

2. DESCRIPTION OF THE RELATED ART

Recreational fishing, also called sport fishing, is fishing for pleasure or competition. It can be contrasted with commercial fishing, which is fishing for profit, or subsistence fishing, which is fishing for survival. The most common form of recreational fishing is done with a rod, reel, line, hooks and any one of a wide range of baits. Other devices, commonly referred to as terminal tackle, are also used to affect or complement the presentation of the bait to the targeted fish. Some examples of terminal tackle include weights, floats, and swivels. Lures are frequently used in place of bait. Some hobbyists make handmade tackle themselves, including plastic lures and artificial flies. The practice of catching or attempting to catch fish with a hook is known as angling. Lures often have multiple hooks attached to the body of the lure having multiple points each, known as treble hooks. Extreme care must be taken when handling these lures.

One thing that recreational fishing and sport fishing universally has in common is the hooks and fishing line that is used. At times when fishing poles are laid on the ground or other walking surface the poles themselves can be an obstacle and tripping hazard. The hooks and lures that are attached to the fishing lines also create a hazard of getting hooked or stuck into human and animal flesh or other soft tissue. The hooks have extremely sharp points that are able to penetrate nearly anything softer than the metal that they are made of. The fishing line that they are tied to is lightweight and tends to fly or swing uncontrollably while carrying a fishing pole to a fishing location if the hook is not securely attached to an eyelet or something solid on the fishing pole, and can cause injuries. Even when the hook is fastened to the pole, the fishing line will more than likely become tangled at least once during an outing. When multiple fishing poles are involved, tangled lines are almost a certainty. Fishing poles will most assuredly get leaned up against something and inadvertently get knocked over, tangling the line with other objects or other fishing poles. Fishing poles also tend to get stacked for transporting to a fishing location, and the resulting tangled lines can be frustrating to untangle. One person carrying more than one pole at a time to a fishing spot can not only be inconvenient, but may be hazardous if hooks or lures are attached already to the end of the fishing line. A safe, neat, convenient, and orderly solution to the problem of tangled lines when transporting, storing, and carrying multiple fishing poles is needed.

Various attempts have been made to solve the above-mentioned problems such as those found in U.S. Pat. Nos. 6,658,786; 5,803,519; D456,974; 4,311,262; 2003/0051388; and 3,987,574. This art is representative of fishing rod carrying means. None of the above inventions and patents, taken either singly or in combination, is seen to describe the invention as claimed.

Ideally, a fishing rod retainer system should provide convenience of use, and yet, would operate reliably and be manufactured at a modest expense. Thus, a need exists for a reliable fishing rod retainer system to provide a user the ability to easily carry multiple fishing poles with one hand and store them in a vertical position without tangling the fishing lines, to avoid injuries and to avoid the above-mentioned problems.

BRIEF SUMMARY OF THE INVENTION

In view of the foregoing disadvantages inherent in the known fishing equipment art, the present invention provides a novel fishing rod retainer system. The general purpose of the present invention, which will be described subsequently in greater detail, is to provide the ability to easily carry and store multiple fishing poles with one hand without tangling fishing lines and avoid injuries.

A fishing rod retainer system is disclosed herein, in a preferred embodiment, comprising a multi-fishing-rod holder assembly having a center column with a first end and a second end, a carrier-handle having a top-end and a bottom end, a first end-cap pole retainer comprising a first center column receiver, a plurality of first pole receivers, a top-end handle receiver, a second end-cap pole retainer comprising a second center column receiver, a plurality of second pole receivers, and a bottom-end handle receiver.

The first end of the center column is frictionally inserted into the first center column receiver of the first end-cap pole retainer and the second end of the center column is frictionally inserted into the second center column receiver of the second end-cap pole retainer. The first end-cap pole retainer and the second end-cap pole retainer are preferably spaced about 7¾ inches apart, the first end-cap pole retainer and the second end-cap pole retainer being frictionally and slideably inserted onto the center column. The first end-cap pole retainer and the second end-cap pole retainer may comprise rubber or a soft plastic. The center column is preferably cylindrical in shape, about 2½ inches in diameter (up to about 4½ inches in diameter), and about 7 inches in length, but is usually less than 17 inches in length in the preferred embodiment. The center column may further be a hollow tube and constructed of fiberglass, but may be PVC or another light weight plastic.

The top-end of the carrier-handle is frictionally inserted into the top-end handle receiver of the first end-cap pole retainer and the bottom-end of the carrier-handle is frictionally inserted into the bottom-end handle receiver of the second end-cap pole retainer. The plurality of first pole receivers are integral with the first end-cap pole retainer such that the plurality of first pole receivers are disposed evenly about a periphery of the first end-cap pole retainer and are placed equidistantly from a longitudinal center axis of the center column therearound. The plurality of second pole receivers is integral with the second end-cap pole retainer such that the plurality of second pole receivers are disposed evenly about a periphery of the second end-cap pole retainer. The plurality of first pole receivers further may comprise a first webbing between each adjacent first pole receiver and the plurality of second pole receivers further may comprise a second webbing between each adjacent second pole receiver to provide increased structural strength to the first end-cap pole retainer and the second end-cap pole retainer respectively to increase longevity of the product.

The first end-cap pole retainer and the second end-cap pole retainer may be about 7¾ inches in diameter and about 1¾ inches in height each. The plurality of first pole receivers and the plurality of second pole receivers are tubular shaped in a preferred embodiment, each being able to receive a substantially cylindrical object of a smaller diameter such as a rod end. The inner volume of the plurality of first pole receivers and the plurality of second pole receivers each may have a length of about 1¾ inches and an inner diameter of about 1 3/16 inches. The centerline of each of the first pole receivers are co-linear with a corresponding centerline of each of the second pole receivers such that a handle of a fishing pole is able to be inserted through any one of the first pole receivers and into a corresponding second pole receiver.

The carrier-handle is preferably cylindrical in shape and about ¾ inches in diameter and about 6 inches in length. A centerline of the carrier-handle is parallel with each of the centerlines of the first pole receivers and the centerlines of the second pole receivers. The first end-cap pole retainer and the second end-cap pole retainer further may comprise a flat planar surface opposite the first center column receiver and the second center column receiver respectively such that the multi-fishing-rod holder assembly is able to be securely placed flat in a vertical position on a flat ground planar surface. The first end-cap pole retainer and the second end-cap pole retainer further may comprise a concentrically located aperture about 2 inches in diameter so that the multi-fishing-rod holder assembly is able to be slideably inserted onto a post for greater stability during usage if desired by a user.

The multi-fishing-rod holder assembly is designed to be able to prevent at least one fishing line from becoming tangled when a plurality of other fishing poles are slideably inserted into the multi-fishing-rod holder assembly. The multi-fishing-rod holder assembly is useful for inserting a plurality of the fishing poles through the plurality of first pole receivers and into the plurality of second pole receivers to be carried by a user in a horizontal position via the carrier-handle, and alternately to be stored in a vertical position when in a ready-for-use condition.

The fishing rod retainer system may further comprise a kit having at least one fully assembled multi-fishing-rod holder assembly and at least one set of user instructions.

A method of using the fishing rod retainer system is also disclosed herein and may comprise the steps of slideably inserting at least one fishing pole into the multi-fishing-rod holder assembly via through at least one first pole receiver and at least one second pole receiver, transporting the multi-fishing-rod holder assembly having at least one fishing pole inserted to a first location, removing the fishing pole(s), using the fishing pole(s), re-inserting at least one fishing pole into the multi-fishing-rod holder assembly, transporting the multi-fishing-rod holder assembly having at least one fishing rod inserted to a second location, and storing the multi-fishing-rod holder assembly having at least one fishing pole inserted.

The present invention holds significant improvements and serves as a fishing rod retainer system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, fishing rod retainer system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a fishing pole carrier device and more particularly to a fishing rod retainer system as used to improve the ability of a user to easily carry multiple fishing poles and store them in a vertical position without tangling fishing lines and also avoiding injuries.

Generally speaking, the fishing rod retainer system is a handy device for enabling a fisherman to conveniently carry and transport several fishing poles at once, without tangling the fishing lines, to a fishing location for use. The device also uniquely enables the fisherman to stably place the multi-fishing-rod holder assembly in a vertical position on the flat outside surface of the second end-cap pole retainer, onto a flat ground surface, with multiple fishing rods securely placed within the plurality of first pole receivers and second pole receivers. The first end-cap pole retainer and the second end-cap pole retainer have in-line concentrically located apertures that are about 2 inches in diameter so that the multi-fishing-rod holder assembly is able to be slideably inserted onto a secure upright post for complete stability during usage.

Figure 1:
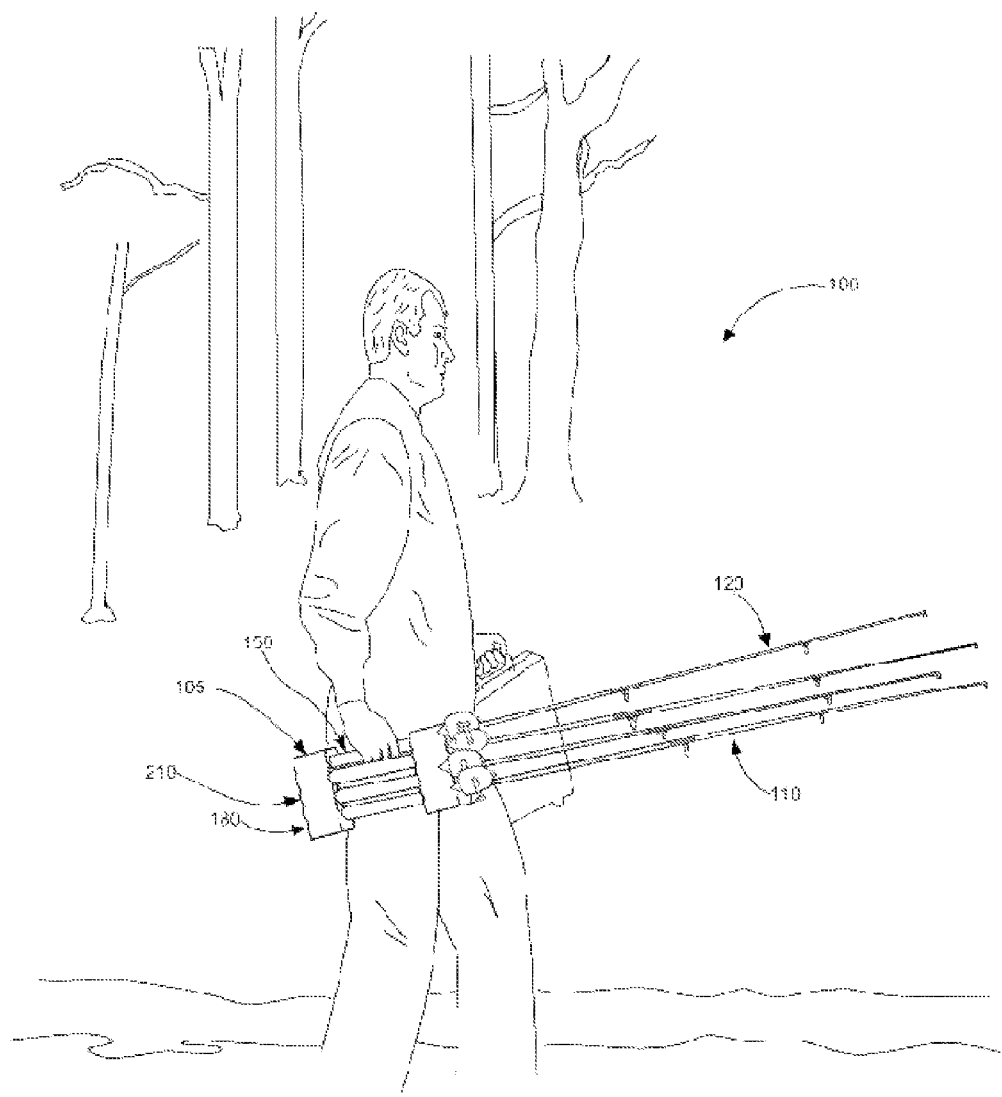
FIG. 1 shows a perspective view illustrating an in-use condition of a fishing rod retainer system according to an embodiment of the present invention.

In greater detail now, referring to the drawings by numerals of reference, there is shown in FIG. 1, a perspective view illustrating an in-use condition of fishing rod retainer system 100 according to an embodiment of the present invention.

Multi-fishing-rod holder assembly 105 is designed to be able to effectively prevent at least one fishing line 110 from becoming tangled when a plurality of other fishing pole(s) 120 are slideably inserted into multi-fishing-rod holder assembly 105. Multi-fishing-rod holder assembly 105 is useful for inserting a plurality of fishing pole(s) 120 through the plurality of first pole receivers 130 and into the plurality of second pole receivers 140 to be carried by a user in a horizontal position via carrier-handle 150, and alternately to be stored in vertical position 160 when in a ready-for-use condition. In this way the present invention is multi-purpose. First end-cap pole retainer 170 and second end-cap pole retainer 180 further may comprise flat planar surface 190 opposite first center column receiver 199 and second center column receiver 200 respectively such that multi-fishing-rod holder assembly 105 is able to be securely placed flat in vertical position 160 on flat planar surface 190. First end-cap pole retainer 170 and second end-cap pole retainer 180 may further comprise a concentrically located aperture 210 about 2 inches in diameter so that multi-fishing-rod holder assembly 105 is able to be slideably inserted onto a post for greater stability during usage if desired by a user.

Figure 2:
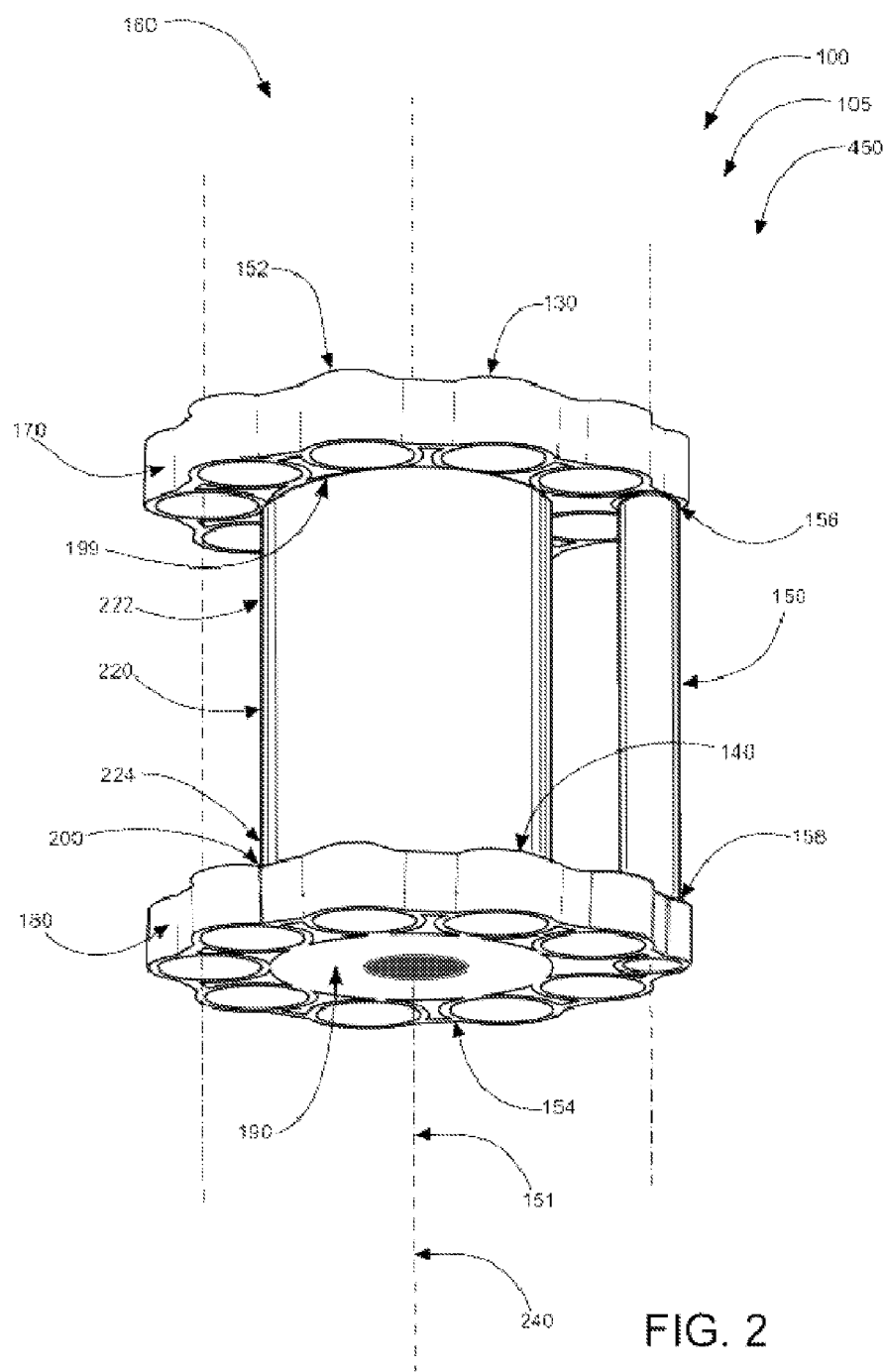
FIG. 2 is a perspective view illustrating a side profile view of the fishing rod retainer system according to an embodiment of the present invention of FIG. 1.

Referring now to FIG. 2, a side perspective view illustrating fishing rod retainer system 100 according to an embodiment of the present invention of FIG. 1.

Fishing rod retainer system 100 may comprise multi-fishing-rod holder assembly 105 having center column 220 (with first end 222 and second end 224), carrier-handle 150 (having top-end 152 and bottom end 154), first end-cap pole retainer 170 comprising first center column receiver 199, a plurality of first pole receiver(s) 130, top-end handle receiver 156, second end-cap pole retainer 180 (comprising second center column receiver 200), a plurality of second pole receivers 140, and bottom end handle receiver 158. First end 222 of center column 220 is frictionally inserted into first center column receiver 199 of first end-cap pole retainer 170 and second end 224 of center column 220 is frictionally inserted into second center column receiver 200 of second end-cap pole retainer 180. First end-cap pole retainer 170 and second end-cap pole retainer 180 are preferably spaced about 7¾ inches apart, first end-cap pole retainer 170 and second end-cap pole retainer 180 being frictionally and slideably inserted onto center column 220.

First end-cap pole retainer 170 and second end-cap pole retainer 180 may comprise rubber or a soft plastic. Center column 220 is preferably cylindrical in shape, about 4½ inches in diameter, and about 7 inches in length but may be less than 17 inches in length in any embodiment. Center column 220 may comprise a hollow tube and be constructed of fiberglass. The hollow tube may comprise plastic material in alternate embodiments. Top-end 152 of carrier-handle 150 is frictionally inserted into top-end handle receiver 156 of first end-cap pole retainer 170 and bottom end 154 of carrier-handle 150 is frictionally inserted into bottom end handle receiver 158 of second end-cap pole retainer 180. Carrier-handle 150 is preferably cylindrical in shape and about ¾ inches in diameter and about 6 inches in length. The centerline 151 of carrier-handle 150 is parallel with each of the centerlines of first pole receiver(s) 130 and the centerlines of second pole receivers 140.

Figure 3:
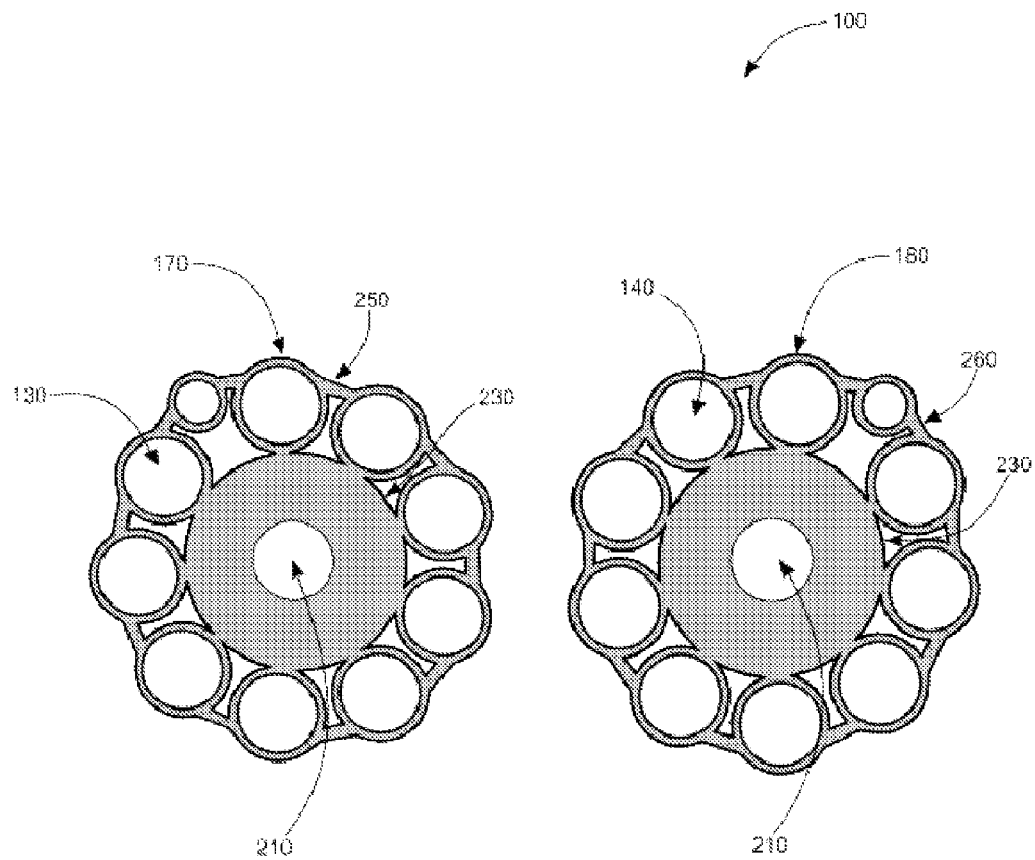
FIG. 3 is a perspective view illustrating an outside view of a first and second end-cap pole retainer of the fishing rod retainer system according to an embodiment of the present invention of FIG. 1.

Referring now to FIG. 3, an outside view of first end-cap pole retainer 170 and second end-cap pole retainer 180 of fishing rod retainer system 100 according to an embodiment of the present invention of FIG. 1.

The plurality of first pole receiver(s) 130 are preferably integral with first end-cap pole retainer 170 such that the plurality of first pole receiver(s) 130 are disposed evenly about periphery 230 of first end-cap pole retainer 170 and are placed equidistantly from longitudinal center axis 240 of center column 220. The plurality of second pole receivers 140 is integral with second end-cap pole retainer 180 such that the plurality of second pole receivers 140 are disposed evenly about periphery 230 of second end-cap pole retainer 180. First pole receiver(s) 130 further may comprise first webbing 250 between each adjacent first pole receiver(s) 130 and the plurality of second pole receivers 140 may further comprise second webbing 260 between each adjacent second pole receiver(s) 140 to provide increased structural strength to first end-cap pole retainer 170 and second end-cap pole retainer 180 respectively. First end-cap pole retainer 170 and second end-cap pole retainer 180 may be about 7¾ inches in diameter and about 1¾ inches in height each.

Figure 4:
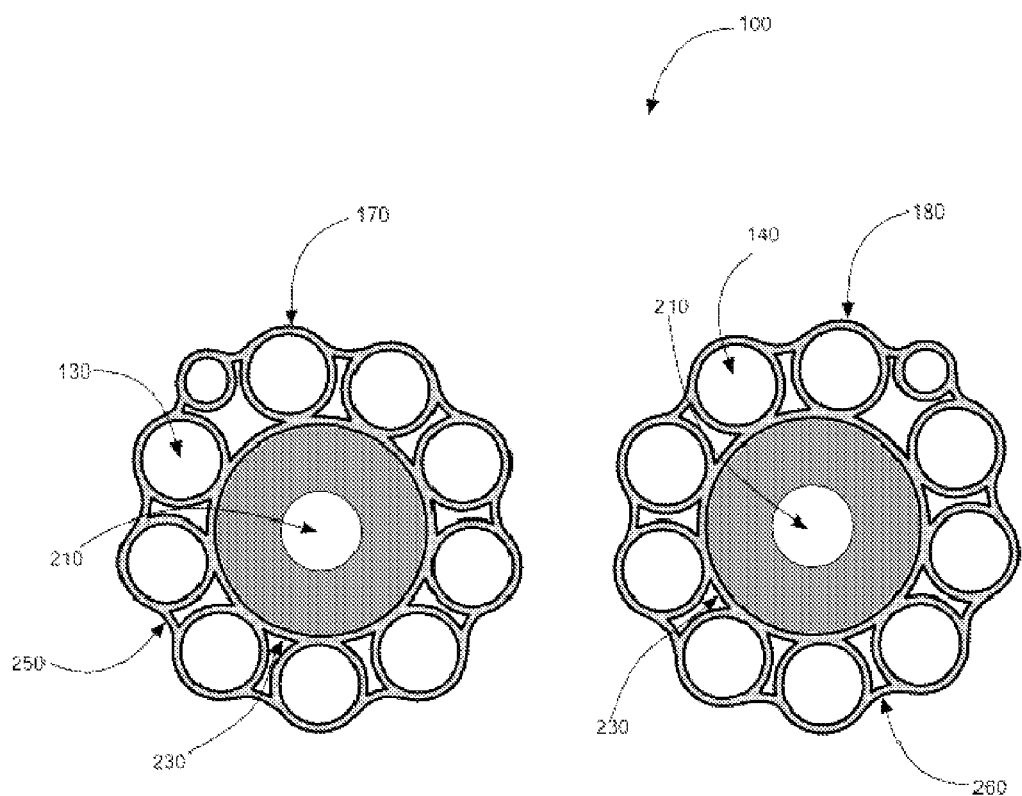
FIG. 4 is an inside view of the first and second end-cap pole retainer of the fishing rod retainer system according to an embodiment of the present invention of FIG. 1.

Referring now to FIG. 4, an inside view of first end-cap pole retainer 170 and second end-cap pole retainer 180 of fishing rod retainer system 100 according to an embodiment of the present invention of FIG. 1.

The plurality of first pole receiver(s) 130 and the plurality of second pole receivers 140 are tubular shaped in a preferred embodiment, each being able to receive a substantially cylindrical object of a smaller diameter (rod end or the like). The inner volume of the plurality of first pole receiver(s) 130 and the plurality of second pole receivers 140 each may have a length of about 1¾ inches and an inner diameter of about 1 3/16 inches. The centerline of each of first pole receiver(s) 130 are co-linear with a corresponding centerline of each of second pole receivers 140 such that a handle of fishing pole(s) 120 is able to be inserted through any one of first pole receiver(s) 130 and into a corresponding second pole receivers 140, as shown.

Fishing rod retainer system 100 may be sold as kit 450 comprising the following parts: at least one fully assembled multi-fishing-rod holder assembly 105; and at least one set of user instructions. Fishing rod retainer system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different receiver combinations, parts may be sold separately, etc., may be sufficient.

Figure 5:
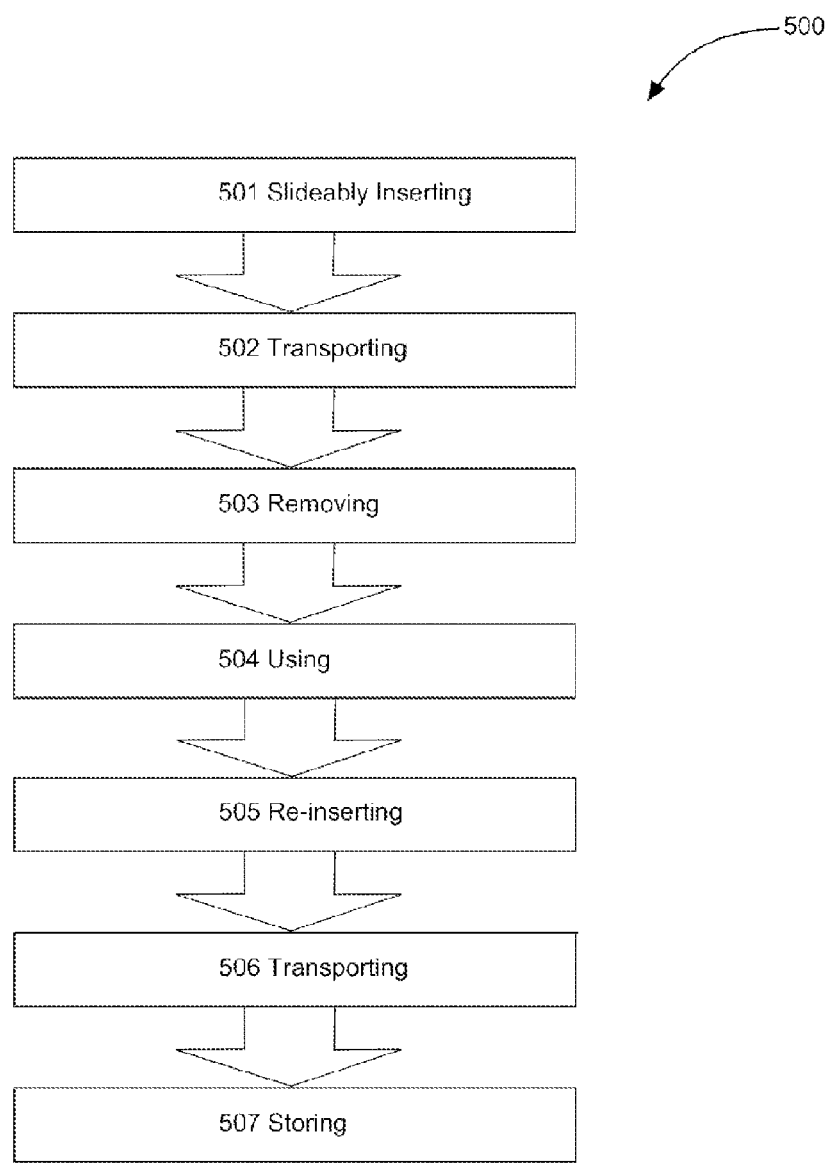
FIG. 5 is a flowchart illustrating a method of use for the fishing rod retainer system according to an embodiment of the present invention of FIGS. 1-4.

Referring now to FIG. 5, a flow chart illustrating method of use 500 for fishing rod retainer system 100.

Method of use 500 for fishing rod retainer system 100 may comprise the steps of: step one 501 slideably inserting at least one fishing pole(s) 120 into multi-fishing-rod holder assembly 105 via at least one first pole receiver(s) 130 and at least one second pole receiver(s) 140; step two 502 transporting multi-fishing-rod holder assembly 105, to a first location having at least one fishing pole 120 inserted therein; step three 503 removing at least one fishing pole(s) 120; step four 504 using at least one fishing pole(s) 120; step five 505 re-inserting at least one fishing pole(s) 120 into multi-fishing-rod holder assembly 105; step six 506 transporting multi-fishing-rod holder assembly 105 to a second location, having at least one fishing pole(s) 120 inserted therein; and step seven 507 storing multi-fishing-rod holder assembly 105 having at least one fishing pole(s) 120 inserted therein.

It should be noted that steps 503 and 504 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A fishing rod retainer system comprising:
   a multi-fishing-rod holder assembly comprising;
   a center column having a first end and a second end;
   a carrier-handle having a top-end and a bottom end;
   a first end-cap pole retainer comprising;
   a first center column receiver;
   a plurality of first pole receivers; and
   a top-end handle receiver;
   a second end-cap pole retainer comprising;
   a second center column receiver;
   a plurality of second pole receivers; and
   a bottom-end handle receiver;
   wherein said first end of said center column is frictionally inserted into said first center column receiver of said first end-cap pole retainer;
   wherein said second end of said center column is frictionally inserted into said second center column receiver of said second end-cap pole retainer;
   wherein said first end-cap pole retainer and said second end-cap pole retainer are spaced about 7¾ inches therebetween, said first end-cap pole retainer and said second end-cap pole retainer frictionally and slideably inserted onto said center column;
   wherein said first end-cap pole retainer and said second end-cap pole retainer comprise rubber;
   wherein said center column is cylindrical in shape, about 4½ inches in diameter, and about 7 inches in length;
   wherein said center column is less than 17 inches in length;
   wherein said center column further comprises a hollow tube;
   wherein said center column is fiberglass;
   wherein said top-end of said carrier-handle is frictionally inserted into said top-end handle receiver of said first end-cap pole retainer;
   wherein said bottom-end of said carrier-handle is frictionally inserted into said bottom-end handle receiver of said second end-cap pole retainer;
   wherein said plurality of first pole receivers are integral with said first end-cap pole retainer such that said plurality of first pole receivers are disposed evenly about a periphery of said first end-cap pole retainer and equidistantly from a longitudinal center axis;
   wherein said plurality of second pole receivers are integral with said second end-cap pole retainer such that said plurality of second pole receivers are disposed evenly about a periphery of said second end-cap pole retainer;
   wherein said plurality of first pole receivers further comprise a first webbing between each adjacent said first pole receiver and wherein said plurality of second pole receivers further comprise a second webbing between each adjacent said second pole receiver to provide increased structural strength to said first end-cap pole retainer and said second end-cap pole retainer respectively;
   wherein said first end-cap pole retainer and said second end-cap pole retainer are about 7¾ inches in diameter and about 1¾ inches in height each;
   wherein said plurality of first pole receivers and said plurality of second pole receivers are tubular shaped, each being able to receive a substantially cylindrical object of a smaller diameter than said first pole receivers and said second pole receivers;
   wherein said inner volume of said plurality of first pole receivers and said plurality of second pole receivers each have a length of about 1¾ inches;
   wherein said inner volume of said plurality of first pole receivers and said plurality of second pole receivers further comprise an inner diameter of about 1 3/16 inches;
   wherein a centerline of each of said first pole receivers are co-linear with a corresponding centerline of each of said second pole receivers such that a handle of a fishing pole is able to be inserted through any one of said first pole receivers and into a corresponding said second pole receiver;
   wherein said carrier-handle is cylindrical in shape;
   wherein said carrier-handle is about ¾ inches in diameter and about 6 inches in length;
   wherein a centerline of said carrier-handle is parallel with each of said centerlines of said first pole receivers and said centerlines of said second pole receivers;
   wherein said first end-cap pole retainer and said second end-cap pole retainer further comprise a flat planar surface opposite said first center column receiver and said second center column receiver respectively such that said multifishing-rod holder assembly is able to be securely placed in a vertical position on a ground planar surface;
   wherein said first end-cap pole retainer and said second end-cap pole retainer further comprise a concentrically located aperture about 2 inches in diameter such that said multi-fishing-rod holder assembly is able to be slideably inserted onto a post for greater stability during usage;
   wherein said multi-fishing-rod holder assembly is designed to be able to prevent at least one fishing line from becoming tangled when a plurality of said fishing poles are slideably inserted into said multi-fishing-rod holder assembly; and
   wherein said multi-fishing-rod holder assembly is useful for inserting a plurality of said fishing poles through said plurality of first pole receivers and into said plurality of second pole receivers to be carried by a user in a horizontal position via said carrier-handle, and alternately to be stored in a vertical position when in a ready-for-use condition.

2. The fishing rod retainer system of claim 1 further comprising a kit having:
  at least one fully assembled said multi-fishing-rod holder assembly; and
  at least one set of user instructions.

* * * * *